(12) United States Patent
Reynes

(10) Patent No.: US 8,167,241 B2
(45) Date of Patent: May 1, 2012

(54) SYSTEM FOR OPENING AND CLOSING THE FLAP OF A CASING FOR THE LANDING GEAR OF AN AIRCRAFT

(75) Inventor: Didier Reynes, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 796 days.

(21) Appl. No.: 11/916,375

(22) PCT Filed: Jun. 6, 2006

(86) PCT No.: PCT/FR2006/001281
§ 371 (c)(1),
(2), (4) Date: Oct. 21, 2008

(87) PCT Pub. No.: WO2006/131641
PCT Pub. Date: Dec. 14, 2006

(65) Prior Publication Data
US 2009/0127389 A1    May 21, 2009

(30) Foreign Application Priority Data
Jun. 7, 2005 (FR) ...................................... 05 51527

(51) Int. Cl.
*B64C 25/10* (2006.01)
*B64C 1/14* (2006.01)
(52) U.S. Cl. .................. 244/102 A; 244/129.5

(58) Field of Classification Search .............. 244/102 R, 244/102 A, 129.4, 129.5
See application file for complete search history.

(56) References Cited

U.S. PATENT DOCUMENTS

| 2,346,797 | A | * | 4/1944 | Stephens ................... 244/102 R |
| 2,371,699 | A | * | 3/1945 | Martin ....................... 244/102 A |
| 2,406,710 | A | | 8/1946 | Riggles, Jr. et al. |
| 2,548,832 | A | | 4/1951 | Tydon |
| 2,630,990 | A | * | 3/1953 | Lindquist et al. ........ 244/102 SL |
| 4,412,665 | A | | 11/1983 | Kramer et al. |
| 5,482,228 | A | | 1/1996 | Hoshino et al. |
| 7,338,012 | B2 | * | 3/2008 | Rouyre ...................... 244/102 R |
| 2005/0211848 | A1 | * | 9/2005 | Rouyre ....................... 244/129.4 |

FOREIGN PATENT DOCUMENTS

GB    713258 A    8/1954

* cited by examiner

*Primary Examiner* — Timothy D Collins
*Assistant Examiner* — Joseph W Sanderson
(74) *Attorney, Agent, or Firm* — Perman & Green, LLP

(57) ABSTRACT

A system for opening and closing the flap of a casing for the landing gear of an aircraft includes a mechanical connection between the landing gear and the flap. The connection includes a first connecting rod which is fixed to the landing gear, and a second connecting rod which is fixed to the flap, the first and second connecting rods being connected by an articulation mechanism.

7 Claims, 3 Drawing Sheets

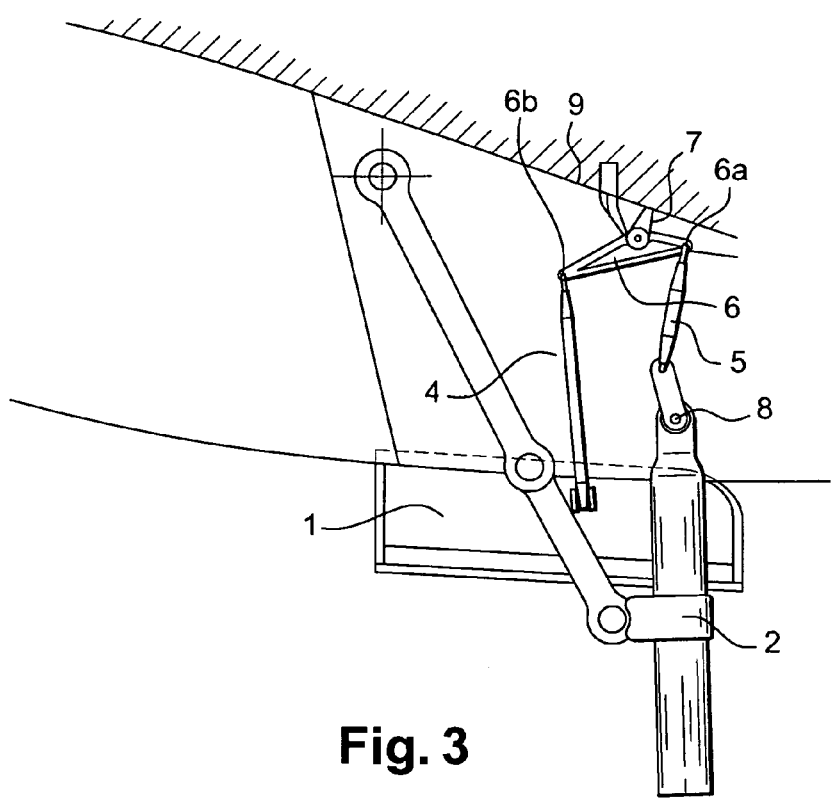
Fig. 3
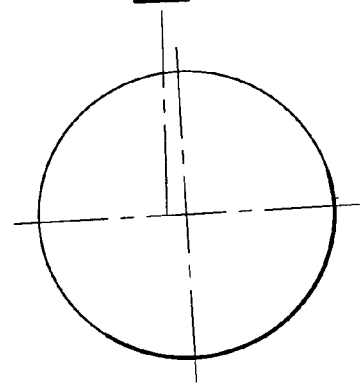
Fig. 4
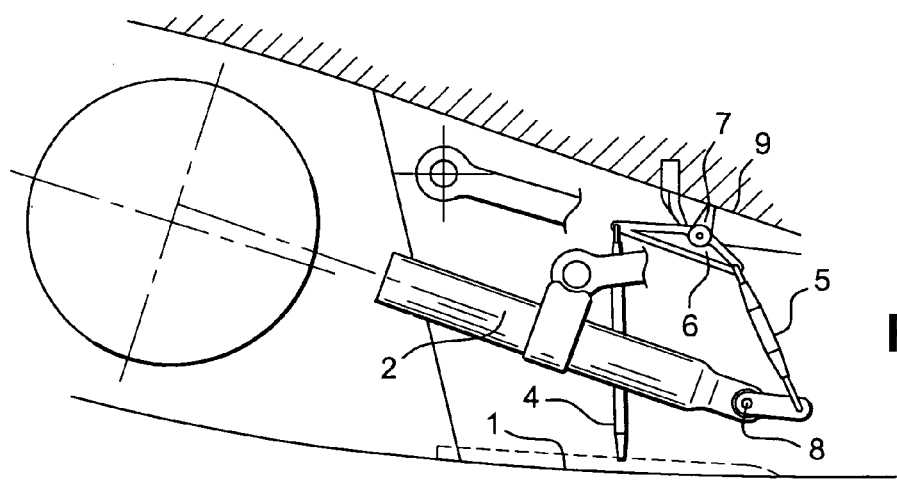

SYSTEM FOR OPENING AND CLOSING THE FLAP OF A CASING FOR THE LANDING GEAR OF AN AIRCRAFT

CROSS REFERENCE TO RELATED APPLICATIONS

This application is the National Stage of International Application No. PCT/FP2006/001281, International Filing Date, 6 Jun. 2006, which designated the United States of America, and which International Application was published under PCT Article 21 (2) as WO Publication No. WO2006/131641 and which claims priority from French Application No. 0551527, filed on 7 Jun. 2005, the disclosures of which are incorporated herein by reference in their entireties.

BACKGROUND

1. Field

The disclosed embodiments relate to a system for opening and closing a flap or door of the landing gear well or casing of an aircraft to allow the door to open by the minimum amount when the landing gear is down.

The disclosed embodiments find applications in the field of aeronautics and, in particular, in the field of doors that close the landing gear well of an aircraft.

2. Brief Description of Related Developments

A landing gear well is a housing intended to accommodate a landing gear of an aircraft, particularly when the landing gear is placed under the fuselage of the aircraft. This gear well is generally closed by one or more doors. There are various kinds of door:

main doors which open to allow the landing gear to be lowered and which close again once the gear is down, and secondary doors, for example front landing gear doors, which open to allow the landing gear to be lowered and remain open as long as the gear is down.

A landing gear door, also sometimes known as an undercarriage door, usually comprises a panel, fixed to articulating arms. In general, these articulating arms are articulated to the structure of the aircraft about a pivot pin which is offset toward the inside of the gear well with respect to the panel. When the landing gear is being lowered, the panel is pivoted toward the outside of the fuselage by means of a connecting rod positioned between the panel and the structure, inside the gear well.

In order to preserve the aerodynamics of the fuselage, the pivot pin is positioned inside the gear well. Again, for aerodynamic reasons, the secondary doors have to open as little as possible to allow the landing gear to pass through while at the same time preserving aerodynamic continuity.

At the present time, each secondary door is connected to the landing gear by a direct connection. This direct connection consists of a connecting rod attached, at one end, to the landing gear, for example to the gear leg or to the landing gear strut and, at the other end, to the door. This connecting rod allows the door to be operated directly as a function of movements of the landing gear. Thus, as the landing gear is retracted, the very fact that the landing gear is rising up inside the gear well closes the door. Similarly, as the landing gear is being lowered, this direct connection opens the landing gear door by pushing it toward the outside of the fuselage. More specifically, as the landing gear is being lowered, it rotates about a pivot pin, causing a translational movement of the connecting rod which pushes the door into its open position. A direct connection such as this therefore means that the lowering of the undercarriage and the opening of the door can be instigated at the same time.

For a large-sized aircraft the landing gear is larger in size than a landing gear for an aircraft of conventional size. As a result, the gear well is larger, and, in particular, longer, thus entailing the use of longer doors and/or of a greater number of primary and secondary doors in order to close the gear well.

The increase in the number of doors leads to there being a greater number of door opening and closing systems and therefore to an increase in the volume and mass of the doors. In addition, the increase in the number of doors increases the risk that a door opening and closing system might fail.

The increase in the size of the doors leads to an increase in the mass of each door and to a change in the center of gravity. Now, fitting a conventional control connecting rod to a large-sized door can be done only close to the rear edge of the door, that is to say at one end of the door rather than in the middle of the door. Specifically, the connecting rod cannot be fitted in the middle of the door because when the landing gear is lowered or raised, there would be interference between the connecting rod and the landing gear, that is to say that the connecting rod would be given a movement such that the door would be pushed first of all and then pulled. This interference is due to the different movements of the landing gear as it is raised and lowered. Fitting the connecting rod at one end of the door would have the effect that most of the door would be free, that is to say unsupported, and that it would therefore be subjected to vibrations due to the movement of the aircraft. In addition, for the door to open sufficiently to allow the landing gear to pass, the door would need to open through a relatively large angle, and this would require the use of fittings for securing the door to the structure that have a large angular travel, for example large-sized goosenecks. However, if the gooseneck is large, the volume needed to house this gooseneck when the door is closed, is also large.

SUMMARY

It is precisely the object of the disclosed embodiments to overcome the disadvantages of the aforementioned techniques. To this end, the disclosed embodiments propose a system for opening and closing a landing gear well door comprising two connecting rods connected to one another by an articulation. One of these connecting rods is attached to the landing gear and the other is attached to the landing gear well door. The two connecting rods are connected by an articulation means. In this way, the door is not connected directly to the landing gear. The connection between the landing gear and the door is an indirect one, and is made by way of the articulation means.

A door opening and closing system such as this has the advantage of allowing one of the connecting rods to be attached to the desired point on the door, for example near the center of gravity of the door.

More specifically, the disclosed embodiments relate to a system for opening and closing a door of a landing gear well of an aircraft, comprising mechanical coupling means coupling the landing gear and the door, these coupling means comprising a first connecting rod attached to the landing gear and a second connecting rod attached to the door, characterized in that the first and second connecting rods are connected by means of a bell crank equipped with a reaction fitting mounted such that it can move on the bell crank and fixedly on the gear well.

The disclosed embodiments may also have one or more of the following features:

The bell crank is attached to a wall of the landing gear well.

The bell crank is attached to a roof of the gear well by the reaction fitting.

The second connecting rod is attached near a center of gravity of the door.

The first connecting rod is attached to a pivot pin of the landing gear.

The system comprises a door return means.

The second connecting rod is a sprung connecting rod which acts as a return means.

BRIEF DESCRIPTION OF THE DRAWINGS

FIG. 3 depicts a side view of the system of the disclosed embodiments when the landing gear is lowered.

FIG. 4 depicts a side view of the system of the disclosed embodiments when the landing gear is raised.

DETAILED DESCRIPTION OF EMBODIMENTS

Figure 1:
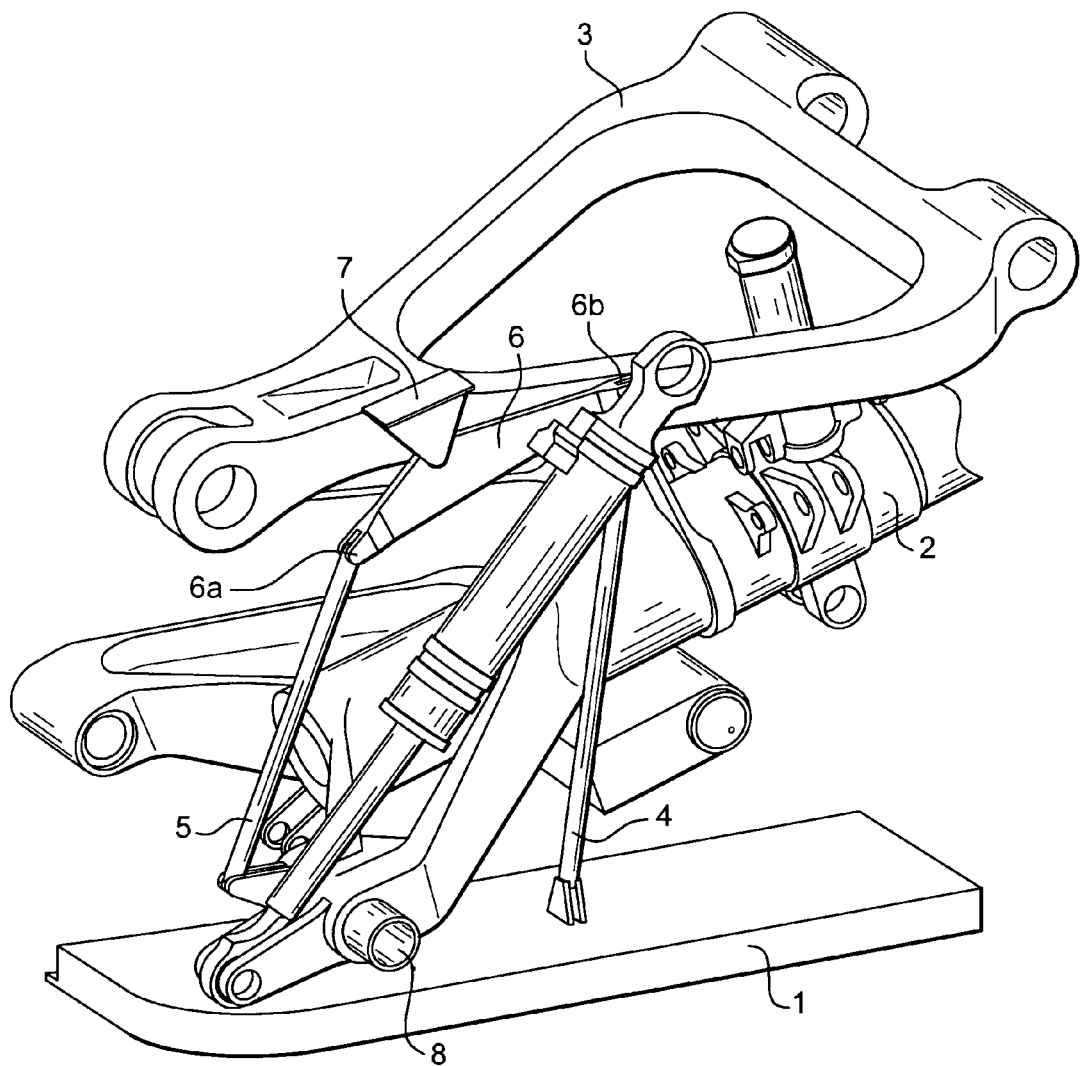
FIG. 1 gives, in a perspective view, a depiction of the system for opening and closing a door according to the disclosed embodiments, when the landing gear is raised.
Figure 2:
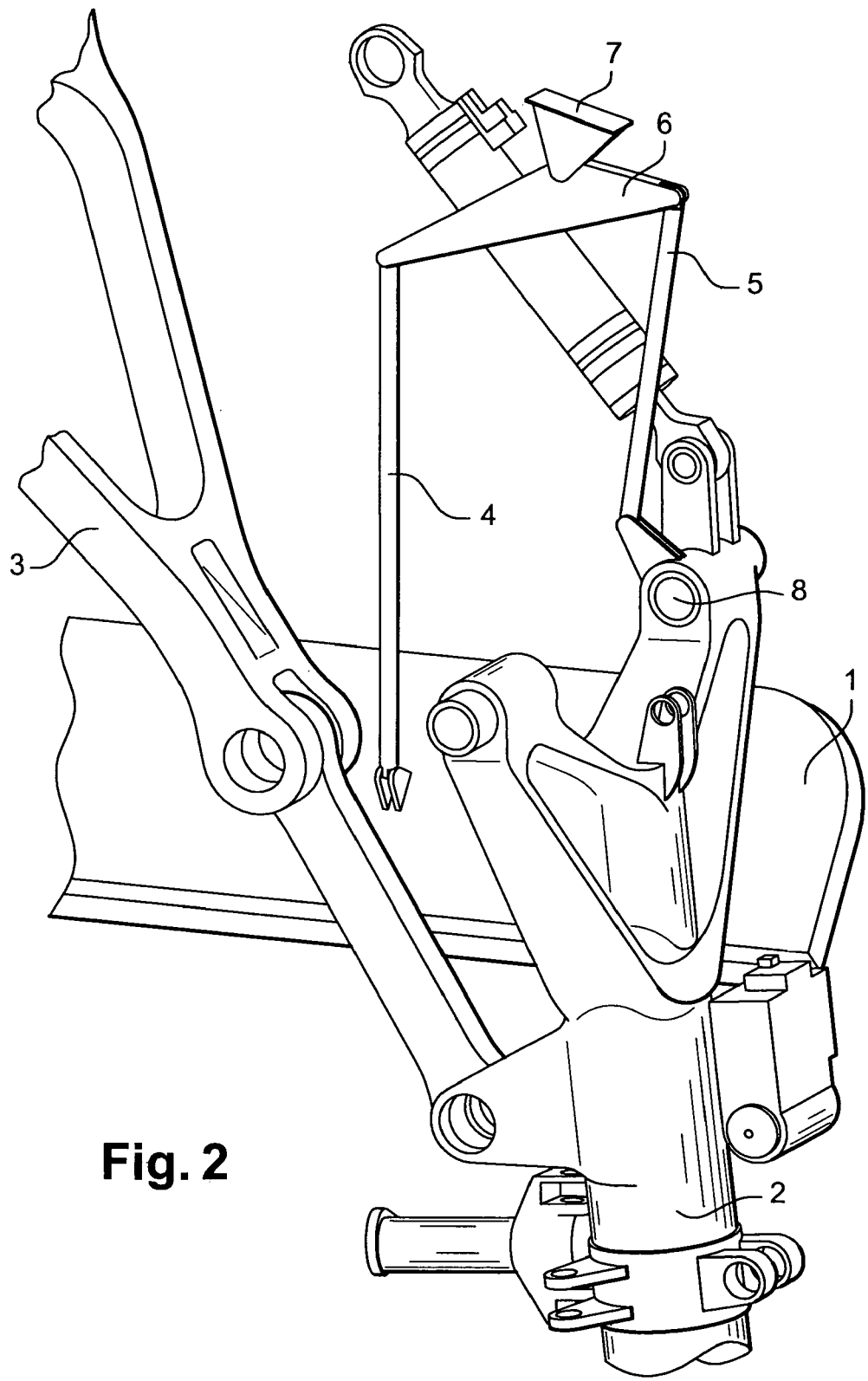
FIG. 2 gives, in a perspective view, a depiction of the door opening and closing system of FIG. 1, when the landing gear is lowered.

FIGS. 1 and 2 show perspective views of the system for opening and closing a door according to the disclosed embodiments, with the landing gear up and down respectively. The landing gear has not been depicted in full in these figures in order to simplify the latter. In the example of these figures, the door 1 is a rear auxiliary door, that is to say a secondary door of the gear well situated toward the rear of the aircraft. This door is intended to remain open as long as the landing gear is down.

FIG. 1 depicts the door opening and closing system, also known as the door attachment system, when the landing gear is housed inside the gear well and the door is closed, that is to say when it lies in the continuity of the fuselage of the aircraft. This FIG. 1 shows the landing gear leg 2 and the landing gear strut 3 or stay, which are conventional components in landing gears. The disclosed embodiments relate to the system of attaching the door to the landing gear.

This attachment system according to the disclosed embodiments comprise a first connecting rod 4 known as the door connecting rod, and a second connecting rod 5 known as the gear connecting rod. The door connecting rod 4 is attached, via a first end, to the gear well door 1. It may be attached at various locations on the door 1. As a preference, it is attached in the middle of the door 1, that is to say approximately at the site of the center of gravity of the door, so as to limit the effect that vibrations have on the door.

The gear connecting rod 5 is attached, via a first end, to one of the components of the landing gear. The gear connecting rod may be attached at various points on the landing gear, for example on the landing gear leg 2 or on the landing gear strut 3. In the example of FIG. 1, it is attached to the landing gear leg 2, particularly to a pivot pin 8 against which the landing gear leg rotates, so as to limit the travel of the connecting rods.

The door connecting rod 4 and gear connecting rod 5 are connected to one another by means of an articulation means 6. More specifically, the second end of the door connecting rod 4 is connected to the second end of the gear connecting rod 5 by this articulation means which provides a mobile connection between the two connecting rods.

In a preferred embodiment, the articulation means 6 is a bell crank. A bell crank is a piece of rigid material able to transmit movement between two parts. According to one embodiment, this bell crank 6 is a triangular component comprising, at two of its ends, fixing adapters 6a, 6b each able to accept one end of a connecting rod. These fixing adapters 6a, 6b may be ball swivels allowing each of the connecting rods to rotate with respect to the bell crank.

The bell crank 6 is fixed, via its vertex 6c, to some component other than the landing gear or the door. It may be attached, for example, to the landing gear well. In the preferred embodiment, the bell crank 6 is attached to a wall of the gear well and, in particular, to the roof of the gear well, the roof being, by definition, the wall that faces the door 1.

The vertex 6c of the bell crank is fitted with a fastener 7, known as the bell crank reaction fitting. This reaction fitting 7 is mounted such that it can move on the bell crank and fixedly on the gear well. In this way, the bell crank 6 is able to rotate with respect to the gear well such that it can transmit the movements received from one connecting rod to the other connecting rod. Thus, when the landing gear moves, the gear connecting rod 5 receives this movement and transmits it to the bell crank 6. The bell crank 6, through a series of rotations, transmits the inverse movement to the door connecting rod 4, which, in turn, transmits this inverse movement to the door 1.

FIG. 2 depicts the attachment system of FIG. 1 in the instance where the landing gear is down. In the example of FIG. 2, the door 1 is in an open position, that is to say is substantially vertical with respect to the fuselage of the aircraft. It can be seen in this FIG. 2 that the landing gear strut 3 and the landing gear leg 2 are in the gear down position. This FIG. 2 shows that the landing gear connecting rod 5 is pushed upward, the bell crank is pivoted, with respect to FIG. 1, and the door connecting rod 4 is pushed downward. The door is therefore pushed into its open position by the door connecting rod 4.

As can be seen in the examples of FIGS. 1 and 2, the bell crank 6 has a substantially triangular shape. At each end of the hypotenuse of this triangle a connecting rod is attached. At the vertex of this triangle is attached the reaction fitting 7. The lengths of the sides of the triangle that forms the bell crank 6 depend on the locations at which the connecting rods 4 and 5 are attached to the door and to the landing gear, on the dynamics and on loads to be transmitted between these connecting rods.

Thus, starting out from the position of FIG. 1 (gear up), in order to progress to the position of FIG. 2 (gear down), the attachment system of the disclosed embodiments allows the following series of movements:

the gear begins to be lowered, which causes the gear connecting rod 5 to move toward the roof of the gear well, the bell crank 6 receives this movement and rotates about the reaction fitting 7, through this rotation and rotations with respect to the connecting rods 4 and 5, the bell crank 6 transmits a movement causing the door connecting rod 4 to move toward the door, this movement of the connecting rod 4 has the effect of pushing the door 1 toward the outside of the aircraft.

In order to progress from the gear down position to the gear up position the movements performed by the attachment system of the disclosed embodiments is simply reversed by comparison with those just described.

FIG. 3 depicts a side view drawing of the attachment system of the disclosed embodiments when the gear is down. This FIG. 3 clearly shows the reaction fitting 7 attached to the roof 9 of the gear well and the bell crank 6 which is able to rotate about this reaction fitting 7. It will be understood that the attachment fitting 7 gives the bell crank 6 two-dimensional freedom of movement in the gear well. In other words, the bell crank 6 rotates about the reaction fitting 7 in a plane.

It will be also be understood, from this FIG. 3, that the movement of the gear connecting rod 5 gives rise to a rotational movement of the bell crank 6 which in turn causes a translational movement of the door connecting rod 4. In the example of FIG. 3, the gear connecting rod 5 is fixed to the pivot pin 8 of the gear leg. This gear connecting rod 5 could also be attached at other points on the landing gear, particularly to components of the landing gear which undergo the lowering and raising movement of the landing gear, so as to transmit this movement to the bell crank 6.

FIG. 4 gives a side view drawing of the attachment system of the disclosed embodiments when the landing gear is up. It will be understood, by comparing this FIG. 4 with FIG. 3 that the raising of the landing gear into the gear well has the effect of lowering the gear connecting rod 5 toward the door, which has the effect of involving the bell crank in a rotational movement. This movement of the bell crank 6 has the effect of causing the door connecting rod 4 to rise up toward the roof 9 of the gear well, thus pulling the door into its closed position.

As explained earlier, the size of the bell crank, particularly the length of the sides of the bell crank, and the length of the connecting rods 4 and 5 can be tailored to suit the size of the door and the location at which the door connecting rod and gear connecting rod are attached. This attachment device thus makes it possible to select the ideal location, on the door, at which to attach the door connecting rod. To limit the effects of vibrations, it is possible to elect to attach the door connecting rod close to the center of gravity of the door, thus balancing the reaction of forces on the door.

In an alternative form of the disclosed embodiments, the attachment system of the disclosed embodiments may comprise means for obviating the problems of flush mounting due to the aerodynamic pressure exerted on the door and deformations of the structure as a result of the cabin pressure exerted on the gear well. What happens is that when the gear is in its up position, because of the deformation of the landing gear attachment on the roof of the gear well caused by the pressurizing of the cabin, the landing gear has a tendency to sag somewhat within the gear well; the door therefore has a tendency to open up appreciably and, as a result, fail to lie flush with the fuselage. The disclosed embodiments propose to solve this problem of the door failing to lie flush in flight by using a door return means. The purpose of this return means is to press the door into its closed position and prevent the door from failing to lie flush.

This return means may be installed on the door connecting rod 4 or 5. It may be an elastic connecting rod, for example a connecting rod fitted with an internal spring that modifies the length of the connecting rod or may alternatively be a connecting rod equipped with a series of washers mounted top to toe in order to compress the connecting rod.

The elastic connecting rod is installed with an initial length that is shorter than the theoretical length required. Thus, as the door closes and comes into contact with its stops, the connecting rod lengthens, thereby compressing its spring. In flight, as the landing gear sags, the connecting rod shortens under the spring force and thus compensates for the sagging of the landing gear and of the bell crank and of the control dynamics.

The invention claimed is:

1. A system for opening and closing a door of a landing gear well of an aircraft, comprising mechanical coupling means coupling a landing gear and the door, these coupling means comprising a first connecting rod attached via a first end to the landing gear and a second connecting rod attached via a first end to the door,
wherein the second end of the first connecting rod and the second end of the second connecting rod are connected to one another by a bell crank equipped with a reaction fitting movably mounted to the bell crank and fixedly mounted to the landing gear well.

2. The system as claimed in claim 1, wherein the bell crank is attached to a wall of the landing gear well.

3. The system as claimed in claim 1, wherein the bell crank is attached to a roof of the landing gear well by the reaction fitting.

4. The system as claimed in claim 1, wherein the second connecting rod is attached approximately at a center of gravity of the door.

5. The system as claimed in claim 1, wherein the first connecting rod is attached to a pivot pin of the landing gear.

6. The system as claimed in claim 1, comprising a door return means.

7. The system as claimed in claim 6, wherein the second connecting rod is a sprung connecting rod which acts as the door return means.

* * * * *